Dec. 6, 1955      J. H. STOEBER      2,725,813
COMBINATION LAWN EDGER AND DITCHER
Filed May 12, 1951      3 Sheets-Sheet 1
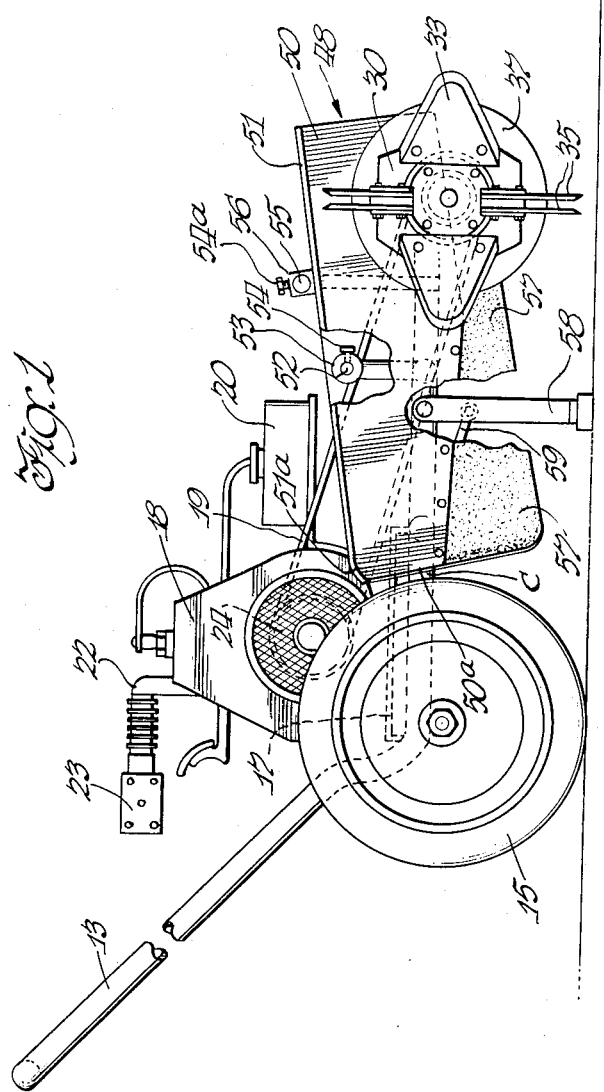
Inventor
Joseph H. Stoeber
by John F. Brezina
Atty.

Dec. 6, 1955 J. H. STOEBER 2,725,813
COMBINATION LAWN EDGER AND DITCHER
Filed May 12, 1951 3 Sheets-Sheet 2
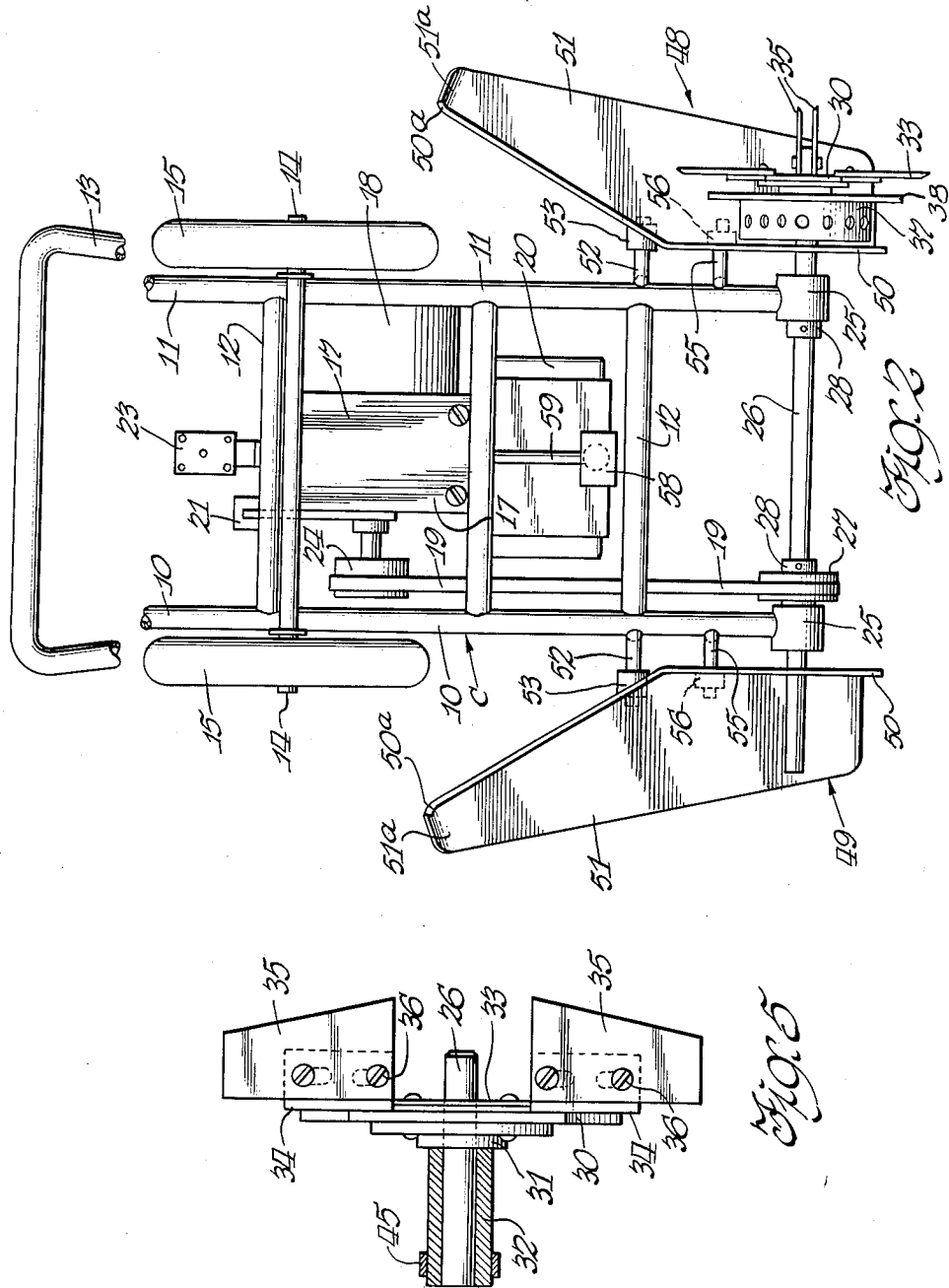
Inventor
Joseph H. Stoeber
by John F. Brezina
Atty.

Dec. 6, 1955   J. H. STOEBER   2,725,813
COMBINATION LAWN EDGER AND DITCHER
Filed May 12, 1951   3 Sheets-Sheet 3
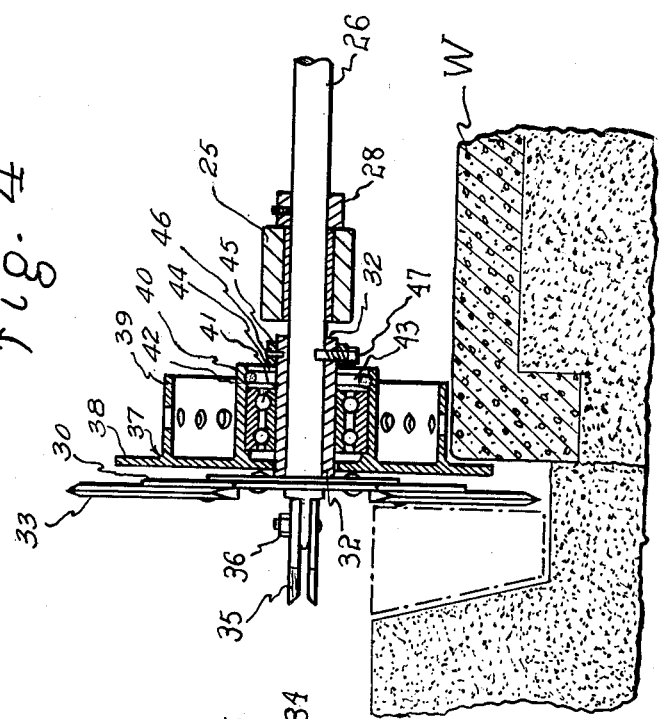
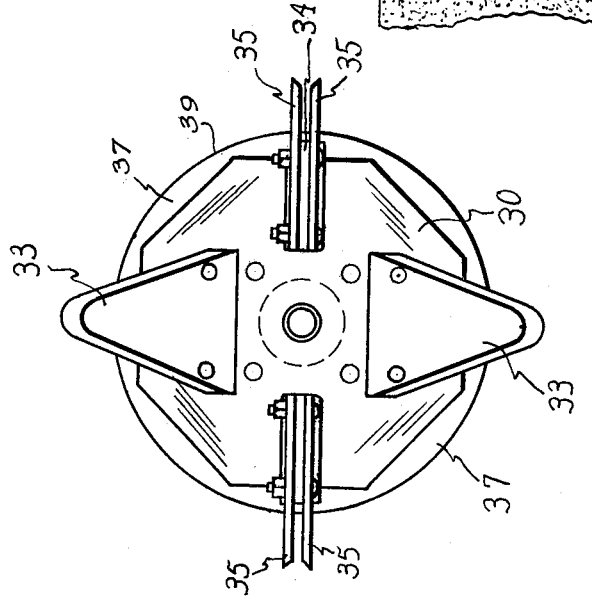
Inventor
Joseph H. Stoeber
BY: John F. Brezina

United States Patent Office 2,725,813
Patented Dec. 6, 1955

2,725,813

COMBINATION LAWN EDGER AND DITCHER

Joseph H. Stoeber, Sarasota, Fla.

Application May 12, 1951, Serial No. 225,985

4 Claims. (Cl. 97—227)

This invention relates to a portable machine or device especially adapted for trimming lawns and for forming a relatively shallow ditch or furrow adjacent the edges of walks and for simultaneously cutting away the grass immediately adjacent the edges of such walks and also such grass as may overhang or overlay portions of the walks themselves.

It is an important object of my invention to provide a relatively inexpensive and portable machine or implement in which the power work producing elements are adapted to be power driven from a power unit carried by said machine and in which a power driven blade-carrying rotor will cut and dig away a ditch, groove or furrow immediately adjacent walk edges and at the same time, spread or scatter the cut away grass and remove dirt over a relatively wide area of the adjacent lawn so as to prevent the deposit of dirt and grass upon the walks themselves.

A further object of my invention is the provision of a portable manually controllable wheeled machine of the class described, in which a power driven rotor is adapted to move in vertical planes and which carries separate blades for cutting in a vertical path along the lateral edges of walks so as to cut away and remove grass and the like which overlays and overhangs the walks themselves and which rotor also carries removably mounted and replaceable scrapers disposed angularly to the general plane of said rotor, said scrapers being adapted to form a clean groove or ditch of the desired size along each edge of the walk, and which said rotor and associated guide wheel may be quickly and easily removed and remounted from one side of the machine to the other according to which edge of the walk or walks are being worked upon.

A further object of my invention is the provision of an edging and ditching machine for lawns having the aforesaid novel features and accomplishments and having a rotatable and removably mounted guide wheel adjacent the ditch forming means, said guide wheel being adapted to engage the respective edges of side walks or the like.

Other important objects of my invention will be apparent from the following description and appended claims.

This invention in the preferred form is illustrated in the accompanying drawings and described in the following specification having numerals of reference borne on the accompanying drawings, in which, Fig. 1 is a side elevational view of a lawn edger and ditcher embodying my invention;

Fig. 2 is a view of the underside of the machine shown in Fig. 1;

Fig. 3 is an end view of the rotor detached from the machine;

Fig. 4 is a fragmentary view of the lawn edging cutter; portions of the structure are cut away to better illustrate the invention, and Fig. 5 is a side elevational view of the rotor shown in Fig. 3.

Referring to Figs. 1 and 2, letter C generally designates a portable carriage which includes a suitable frame composed of laterally spaced bars 10 and 11 connected together by a plurality of connecting rods or bars 12, which may be connected by welding or the like. An elongated bail-type grippable handle 13 is carried by one end portion of said carriage or frame C, and said handle is preferably bent and extends in a diagonal upward direction so as to present its grippable handle portion at normal height for convenient operation. Said handle portion 13 may be optionally formed integral with the side rails or bars 10 and 11.

A rear axle 14 is suitably connected on the rear portion of said carriage substantially as illustrated in Fig. 2, such connection being optionally by suitable brackets or straps as indicated.

Journalled and suitably mounted on the opposite projecting end portions of said axle portion 14 are two traction wheels 15 respectively, which wheels may be of varied construction, though preferably having rubber tires thereon as indicated. Such wheels and axle are adapted to support the rear portion of the machine a short distance from the ground, walk, or other supporting surface. A manually pivotable leg 58, partially shown in Fig. 1, is preferably pivotally connected at one end thereof to said frame, and said leg 58 is adapted to be dropped or moved to depending downward position when the machine is not in use and to support the forward portion of the machine above the walk, ground or other surface. A rearwardly extending manually operable lever (not shown) may be provided for selectively operating said pivoted leg or support 58.

Suitably secured on rear portion of said frame and preferably connected to rearmost cross bars 12 is a supporting base or bracket 17, on which a power element such as an internal combustion motor or engine 18 is adapted to be suitably secured with its crank shaft in a generally transverse direction with respect to the machine. A conventional pulley 24 is adapted to be carried on one end of said engine crank shaft, same being illustrated only in dotted lines in Fig. 1, and said pulley being adapted to have a conventional endless belt 19 mounted thereon. Numeral 20 merely designates a fuel tank communicatively connected to said combustion engine, numeral 21 a crank-style starter and numerals 22 and 23 the exhaust manifold and muffler, respectively.

As illustrated in Fig. 2, forward end portions of the two side bars or side rails 10 and 11 are enlarged to form bosses 25 which are transversely passaged and preferably have suitably aligned bearing sleeves or elements mounted therein. Journalled in the aligned bearing passages of bosses 25 is a transversely extending and normally horizontal front metal shaft 26, the opposite ends of which extend substantially beyond said bosses 25 as illustrated in Fig. 2.

A suitable pulley 27 is secured or mounted on shaft 26 in substantial alignment with pulley 24 of said engine and said endless belt 19 operatively connects said pulleys to thereby transmit power to shaft 26.

It is to be understood that the term "engine 18," which is illustrated only diagrammatically, may optionally include a suitable manually operable clutch means of known form which would permit selective disengageable connection between the engine crank shaft and the pulley 24.

A pair of thrust collars 28, shown in elevation in Fig. 2, are mounted on shaft 26 immediately adjacent inside faces of bosses 25 so as to hold said shaft against longitudinal movement.

Referring to Figs. 3 and 4, numeral 30 designates generally a rotor formed from a metal plate and which may be of varied shape, though in the illustration being an octagon. Rotor 30 is centrally apertured and is secured by rivets or the like to the flange of a hub 31, which hub 31 carries an elongated metal sleeve bearing 32 as illustrated in Fig. 5. Suitably secured on the face of rotor 30 are a plurality of radially extending cutting blades 33, preferably two in number, said cutting blades being preferably of triangular shape so as to present the respective cutting edges in opposite directions and thereby provide for satisfactory cutting operation in both directions of rotation of said rotor. Said radial blades 33, while rigidly secured, are nevertheless removable for sharpening or replacing by means of suitable securing rivets. Secured substantially on diametrically opposite sides and on the face of rotor 30, preferably by welding, is a pair of metal brackets 34 each of which may be of angular or T-shaped cross section. These mounting brackets 34 are disposed in radial direction and have a plurality of slots or elongated spaced apertures therethrough which receive bolts 36.

A pair of relatively sharp ditch forming or scraper blades 35, preferably of substantially the shape illustrated, and having suitably spaced apertures therein, are removably and adjustably secured by suitable bolts 36 on opposite sides of each of said brackets 34, as illustrated in Fig. 3, and Fig. 4. Said scrapers or blades 35 have their projecting edges beveled inwardly as illustrated in Fig. 3 so as to present sharp cutting edges outwardly and toward both directions of rotative travel of said rotor, it being understood that in operation, said rotor will normally be moved from one to the other side of the machine according to the instant need.

Because said blades 35 dig into the earth rapidly to form a ditch or groove adjacent walks, they frequently encounter obstructions such as stones and the like and require occasional resharpening or replacement. My aforedescribed means of quick and easy removable and adjustable mounting of said blades provides for relatively quick removal of said blades for re-edging or replacement thereof, and also provides for increasing the projection thereof with respect to the rotor.

Referring to Figs. 3 and 4, numeral 37 designates a guide or traction wheel having a radial and peripheral flange 38 and an annular "traction" flange 39 which is preferably, though optionally, perforated as illustrated to permit dirt to fall out through such perforations. Guide wheel 37 has a central hub 40 which defines a bearing housing. A pair of ball bearings 41 are mounted within said hub 40, the outer races thereof engaging the hub and the inner races being mounted on the sleeve bearing 32. A bearing retaining washer 42 is removably mounted in position by a ring-shaped spring 43 which seats in an inner groove of hub 40 as shown in Fig. 4.

An outer metal ring 44 is seated within the periphery of the hub and a locking collar 45 is removably secured on the projecting end portion of sleeve bearing 32 by means of a set screw 46 whose inner end bears against bearing 32. A second set screw 47 is threaded through collar 45 and through bearing 32 and bears against shaft 26 so that said shaft and rotor will rotate in unison. When it is desired to remove the rotor and guide wheel from one side of the machine and mount it on the other side (as where the other edge of the walk is to be worked upon), set screw 47 is loosened, the rotor 30 and traction guide wheel 37 are removed and the same are quickly remounted on the opposite end of shaft 26 in the same manner.

The machine will be pushed or pulled so that the flange 38 will engage either vertical edge of a sidewalk, the traction flange 39 thereby rolling on the upper face of the walk so that the depth to which the radial blades of the rotor will cut will be thereby controlled, and this will also set the range of travel of the ditch forming blades 35, which blades 35 may, to some degree, be mounted to project more or less with respect to the rotor, within the limits of their adjustable mounting in slots or slotted apertures in mounting brackets 34.

Referring to Figs. 1 and 2, numerals 48 and 49 designate right and left guards, baffles and deflecting fenders. Each of said fenders or guards comprises an apertured angular vertical inner metal panel 50 and an apertured integral top or upper panel 51. Panel 50 has an outwardly curved rear end portion 50a and upper panel 51 has a downwardly curved deflecting rear end portion 51a. These curved end portions 50a and 51a deflect dirt and cut grass both downwardly and horizontally away from the machine so as to spread the same over a wide area of the lawn, and also prevent such matter from being deposited on the walk and keep it away from the machine portions.

As shown in Fig. 2, the side bars 10 and 11 have outwardly projecting right angled studs or brackets 52 which extend upwardly and outwardly. A passaged mounting boss or member 53 is secured by welding or the like on the intermediate parts of each panel 50, and such boss is removably slipped on the end part of a stud 52 and releasably held by a set screw 54 (Fig. 1).

A second pair of front angular brackets 55 are connected to and carried by side bars 10 and 11 and extend upwardly and horizontally outwardly. Each of the fenders has a forward apertured member or clamp 56 slipped upon one of the brackets 55 and having a set screw 54a normally engaging the bracket 55 whereby each of said fenders is removably and adjustably mounted on and carried by said angular brackets 52 and 55. As shown in Fig. 1, a depending apron 57 of flexible sheet material, i. e. rubber, is secured by rivets or the like to the lower edge of depending panel 50 of each of said fenders. In Fig. 5, the depending rubber aprons 57 are omitted to avoid obstructing the view of other described parts.

As illustrated in side elevation of Fig. 1, and partially from below in Fig. 2, the adjustable support, leg or post 58 is pivoted at its normally upper end to the carriage or frame C, for example, to the longitudinal side bar 10. A suitable link 59, only a fragment of which is illustrated in Fig. 1, is pivotally connected to such support or leg 58 and extends rearwardly so that whenever desired, the operator may push or pull such link 59 to substantially lower the leg 58 or raise the same. The principal function of the pivoted leg 58 is to form a brace or support for the forward portion of the machine when it is not in operation such as when it is desired to allow the machine to stand on a walk or other surface or when storing the same.

I claim:

1. A lawn edger and ditcher comprising, a carriage having a longitudinally extending frame; a transversely extending axle rotatably supported by said frame; a pair of transversely spaced ground engaging wheels journalled on said axle; a transversely extending shaft rotatably supported by said frame, said shaft being longitudinally spaced from said axle; power means for rotating said shaft; a wheel rotatably mounted on one end of said shaft, said wheel having a cylindrical tread flange means engageable with the upwardly facing surface of a walk and an integral, radially extending flange means engageable with an edge of the walk; a rotor secured to said shaft adjacent said last mentioned wheel; a plurality of radially projecting cutting blades attached to said rotor; and a plurality of ditch forming blades mounted on said rotor, said ditch forming blades being disposed in radially extending planes, each of said blades being further disposed at an angle with respect to a vertical face of said rotor.

2. A lawn edging and ditching machine comprising, a portable cart having a pair of ground engaging wheels at one end thereof; power means mounted on said cart; a transversely extending shaft journalled on the end of said cart opposite said ground engaging wheels; a pulley on said shaft driven by said power means; a rotor having a hub portion connected to said shaft for rotation therewith, said rotor including a radially extending, substantially flat plate; a plurality of radially extending cutting blades secured to said plate; a plurality of radially extending scraper blades disposed substantially perpendicular to the vertical plane containing said plate; means for adjustably and removably attaching said scraper blades to said plate; a wheel journalled on the hub portion of said rotor, said wheel having a peripheral surface for engaging the upwardly facing surface of a walk and a radially extending, integrally formed, vertical flange for engaging the side edge of the walk.

3. A lawn edging and ditching machine substantially as set forth in claim 2, having a removably mounted deflecting baffle-like guard having a wall disposed above and extending longitudinally from said rotor.

4. A lawn edging and ditching machine substantially as set forth in claim 2, in which said means for adjustably and removably attaching said scraper blades to said plate includes a plurality of circumferentially spaced brackets secured to the outwardly facing surface of said plate, said brackets being provided with radially extending slots alignable with apertures formed in the scraper blades, and means extending through respective slots and apertures for clamping the scraper blades to said brackets.

References Cited in the file of this patent

UNITED STATES PATENTS

| | | |
|---|---|---|
| 1,644,068 | McBride | Oct. 4, 1927 |
| 2,187,443 | Beamer | Jan. 16, 1940 |
| 2,222,194 | De Bersaques | Nov. 19, 1940 |
| 2,252,888 | Goserud | Aug. 19, 1941 |
| 2,312,569 | Maga | Mar. 2, 1943 |
| 2,432,922 | Muzzy | Dec. 16, 1947 |
| 2,555,441 | Hackney | June 5, 1951 |
| 2,630,747 | Mintz | Mar. 10, 1953 |
| 2,634,667 | Woolwine | Apr. 14, 1953 |